United States Patent
Park et al.

(10) Patent No.: US 9,239,907 B1
(45) Date of Patent: Jan. 19, 2016

(54) TECHNIQUES FOR IDENTIFYING MISLEADING APPLICATIONS

(75) Inventors: Jamie Jooyoung Park, Los Angeles, CA (US); Joseph Huaning Chen, Los Angeles, CA (US)

(73) Assignee: Symantec Corporation, Mountain View, CA (US)

(*) Notice: Subject to any disclaimer, the term of this patent is extended or adjusted under 35 U.S.C. 154(b) by 885 days.

(21) Appl. No.: 12/830,979

(22) Filed: Jul. 6, 2010

(51) Int. Cl.
  G06F 11/00 (2006.01)
  G06F 12/14 (2006.01)
  G06F 12/16 (2006.01)
  G08B 23/00 (2006.01)
  G06F 21/00 (2013.01)

(52) U.S. Cl.
  CPC ...................... G06F 21/00 (2013.01)

(58) Field of Classification Search
  CPC .................. G06F 11/00; G06F 21/00
  USPC ..................... 726/24; 713/188, 193
  See application file for complete search history.

(56) References Cited

U.S. PATENT DOCUMENTS

| | | | |
|---|---|---|---|
| 7,979,907 B2 * | 7/2011 | Schultz et al. | 726/24 |
| 8,079,085 B1 * | 12/2011 | Wu et al. | 726/24 |
| 2007/0016955 A1 * | 1/2007 | Goldberg et al. | 726/25 |
| 2007/0240217 A1 * | 10/2007 | Tuvell et al. | 726/24 |
| 2009/0235355 A1 * | 9/2009 | Chen et al. | 726/23 |
| 2010/0088612 A1 * | 4/2010 | Jia et al. | 715/745 |
| 2010/0186088 A1 * | 7/2010 | Banerjee et al. | 726/23 |
| 2011/0219449 A1 * | 9/2011 | St. Neitzel et al. | 726/23 |
| 2013/0019310 A1 * | 1/2013 | Ben-Itzhak et al. | 726/23 |

OTHER PUBLICATIONS

Heng Yin; Panorama: Capturing System-Wide Information Flow for Malware Detection and Analysis; Jan. 1, 2007; Carnegie Mellon University; pp. 1-13.*

* cited by examiner

*Primary Examiner* — Monjour Rahim
(74) *Attorney, Agent, or Firm* — Wilmer Cutler Pickering Hale and Dorr LLP

(57) ABSTRACT

Techniques for identifying misleading applications are disclosed. In one particular exemplary embodiment, the techniques may be realized as a method for identifying misleading applications comprising receiving a request for network data, parsing the request for network data, using a processor, to determine if one or more portions of the request match a suspicious indicator, identifying the suspicious indicator without using a known malware domain or a known malware signature, and performing a specified action in the event one or more portions of the request match a suspicious indicator.

19 Claims, 4 Drawing Sheets

TECHNIQUES FOR IDENTIFYING MISLEADING APPLICATIONS

FIELD OF THE DISCLOSURE

The present disclosure relates generally to network security and, more particularly, to techniques for identifying misleading applications.

BACKGROUND OF THE DISCLOSURE

Misleading applications are prevalent. Such misleading applications may be fake applications causing users to download malware onto their computers or fake applications which do not work for a suggested purpose (e.g., fake antivirus programs that contain a realistic user interface imitating a scanning action which does not actually scan a computer for viruses). Such misleading applications may introduce viruses, steal account information, charge subscription fees while providing no value, and perform other malicious actions.

Misleading applications may be difficult to detect using conventional computer security techniques. For example, misleading applications may resemble legitimate applications, thus conventional behavioral techniques may not be able to detect such misleading applications. Also, misleading applications may not be associated with a known domain or may frequently change domains, thus blacklisting a domain may not be effective. Furthermore, misleading applications may vary a composition of downloadable software (e.g., varying size or code segments of fake anti-virus software) so that it may be difficult to detect misleading applications using a signature or a footprint.

In view of the foregoing, it may be understood that there may be significant problems and shortcomings associated with current technologies for detecting and/or identifying misleading applications.

SUMMARY OF THE DISCLOSURE

Techniques for identifying misleading applications are disclosed. In one particular exemplary embodiment, the techniques may be realized as a method for identifying misleading applications comprising receiving a request for network data, parsing the request for network data, using a processor, to determine if one or more portions of the request match a suspicious indicator, identifying the suspicious indicator without using a known malware domain (e.g., a known malware URL, network address, or other network indicia associated with known malware) or a known malware signature, and performing a specified action in the event one or more portions of the request match a suspicious indicator.

In accordance with other aspects of this particular exemplary embodiment, the request for network data may contain a Uniform Resource Locator (URL).

In accordance with further aspects of this particular exemplary embodiment, parsing the request for network data to determine if one or more portions of the request match a suspicious indicator may comprise matching a portion of the request for network data against one or more keywords.

In accordance with additional aspects of this particular exemplary embodiment, the keywords may comprise one or more of frequently faked software packages, frequently faked software services, and unknown variants of an approved software package.

In accordance with additional aspects of this particular exemplary embodiment, parsing the request for network data to determine if one or more portions of the request match a suspicious indicator may comprise matching a portion of the request for network data against known software vendor domains to determine if the request is an unknown variation of a known software vendor domain.

In accordance with additional aspects of this particular exemplary embodiment, the method may further comprise using a list of approved vendors for a software product type and marking the request for network data as suspicious in the event the request for network data is associated with the software product type and the request for network data is not associated with a vendor on the list of approved vendors.

In accordance with additional aspects of this particular exemplary embodiment, the software product type may comprise at least one of: an anti-virus software product; a network security software product; an anti-spyware software product; a computer disk optimization software product; an operating system update software product; an operating system registry tool software product; and a computer optimization software product.

In accordance with additional aspects of this particular exemplary embodiment, the method may further comprise determining if the one or more portions of the request matching a suspicious indicator meets a specified threshold, and performing the specified action in the event that the specified threshold is met.

In accordance with additional aspects of this particular exemplary embodiment, the method may further comprise evaluating one or more other types of indicators, and determining if a combination of the one or more portions of the request matching a suspicious indicator and the one or more other types of indicators meet the specified threshold.

In accordance with additional aspects of this particular exemplary embodiment, the one or more other types of indicators may comprise at least one of: an indicator that the request for network data matches a known malware domain; an indicator that requested network data contains a malware signature; an indicator that requested network data is associated with software having suspicious behavior; an indicator that the request for network data matches a software product with a suspicious reputation; and an indicator that requested network data is associated with software containing suspicious strings.

In accordance with additional aspects of this particular exemplary embodiment, the specified action may comprise at least one of: logging the request for network data; denying the request for network data; prompting a user; alerting an administrator; and allowing the request for network data.

In accordance with additional aspects of this particular exemplary embodiment, the method may further comprising accessing a network site associated with the request for network data, evaluating a portion of data at the network site to determine if the portion of data at the network site matches a suspicious indicator, and performing a specified action in the event the portion of data at the network site matches a suspicious indicator.

In accordance with additional aspects of this particular exemplary embodiment, evaluating a portion of data at the network site to determine if the portion of data at the network site matches a suspicious indicator may comprise parsing a web page to identify at least one of: keywords associated with malware; metadata associated with malware; and downloadable malware.

In accordance with additional aspects of this particular exemplary embodiment, the method may further comprise maintaining a list of keywords to be used as suspicious indicators and providing the list of keywords to at least one of: a client based security application; a firewall; a gateway; and a network based security application.

In accordance with additional aspects of this particular exemplary embodiment, the techniques may be realized as at least one processor readable storage medium for storing a computer program of instructions configured to be readable by at least one processor for instructing the at least one processor to execute a computer process for performing the method.

In another particular exemplary embodiment, the techniques may be realized as an article of manufacture for identifying misleading applications. The article of manufacture may comprise at least one non-transitory processor readable storage medium and instructions stored on the at least one medium. The instructions may be configured to be readable from the at least one medium by at least one processor and thereby cause the at least one processor to operate so as to receive a request for network data, parse the request for network data, using a processor, to determine if one or more portions of the request match a suspicious indicator, identify the suspicious indicator without using a known malware domain or a known malware signature, and perform a specified action in the event one or more portions of the request match a suspicious indicator.

In yet another particular exemplary embodiment, the techniques may be realized as a system for identifying misleading applications comprising electronic memory configured to store one or more instructions, one or more processors communicatively coupled to a network, wherein the one or more processors are configured to receive a request for network data, parse the request for network data, using a processor, to determine if one or more portions of the request match suspicious indicator, identify the suspicious indicator without using a known malware domain or a known malware signature, and perform a specified action in the event one or more portions of the request match a suspicious indicator.

In accordance with additional aspects of this particular exemplary embodiment, parsing the request for network data to determine if one or more portions of the request match a suspicious indicator may comprise at least one of: matching a portion of the request for network data against one or more keywords, and matching a portion of the request for network data against known software vendor domains to determine if the request is an unknown variation of a known software vendor domain.

In accordance with additional aspects of this particular exemplary embodiment, the one or more processors may be further configured to evaluate one or more other types of indicators, determine if a combination of the one or more portions of the request matching a suspicious indicator and the one or more other types of indicators meet a specified threshold, and perform the specified action in the event that the specified threshold is met. The one or more other types of indicators may comprise at least one of: an indicator that the request for network data matches a known malware domain, an indicator that requested network data contains a malware signature, an indicator that requested network data is associated with software having suspicious behavior, and an indicator that requested network data is associated with software containing suspicious strings.

In accordance with additional aspects of this particular exemplary embodiment, the one or more processors may be further configured to access a network site associated with the request for network data, evaluate a portion of data at the network site to determine if the portion of data at the network site matches a suspicious indicator, and perform a specified action in the event the portion of data at the network site matches a suspicious indicator.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
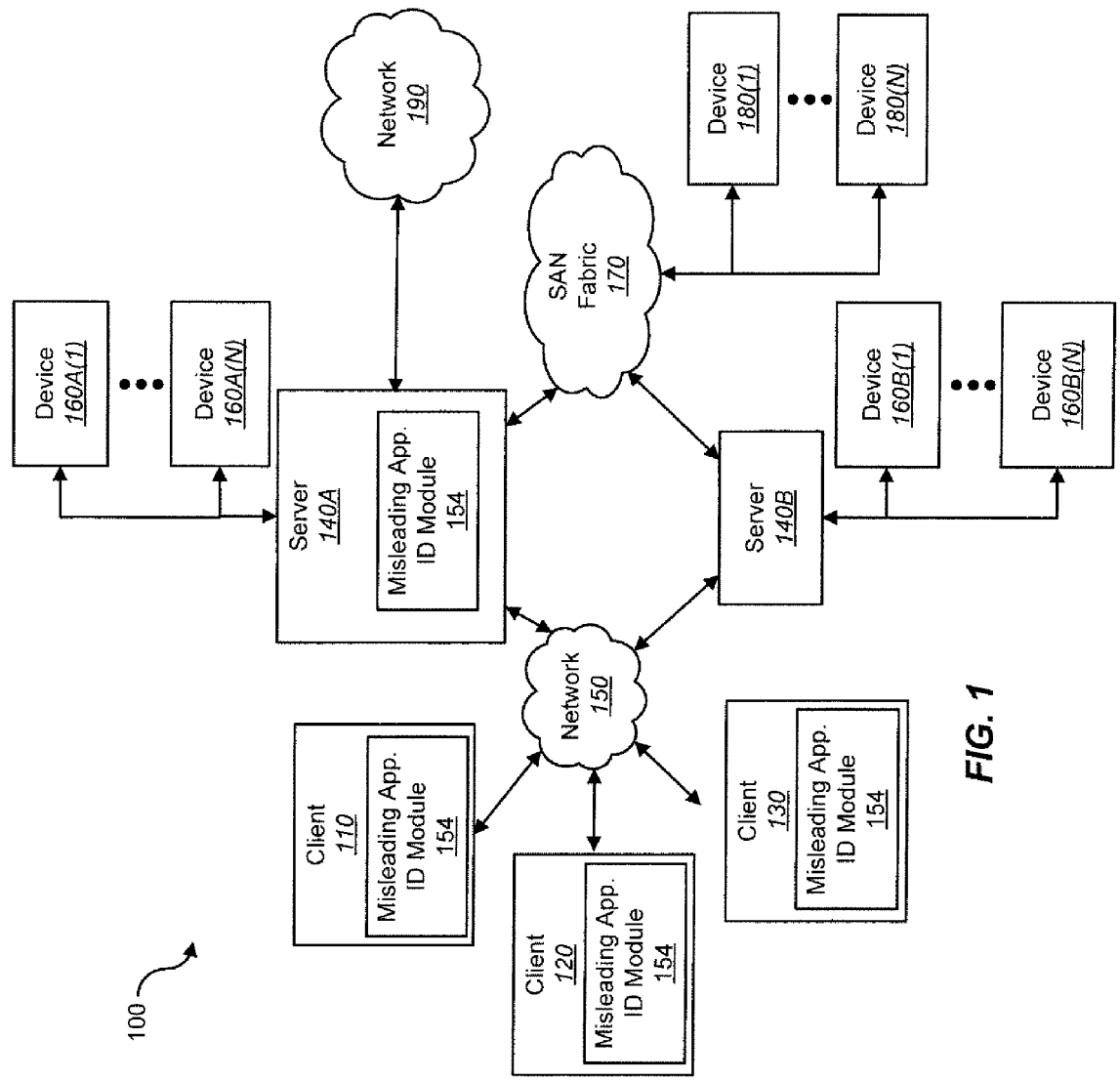
FIG. 1 shows a block diagram depicting a network architecture for identifying misleading applications in accordance with an embodiment of the present disclosure.

FIG. 1 shows a block diagram depicting a network architecture 100 for identifying misleading applications in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Client systems 110, 120 and 130 may also contain a management module (e.g., misleading application identification module 154). Server 140A may be communicatively coupled to storage devices 160A(1)-(N), and server 140B may be communicatively coupled to storage devices 160B(1)-(N). Servers 140A and 140B may also contain a management module (e.g., misleading application identification module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
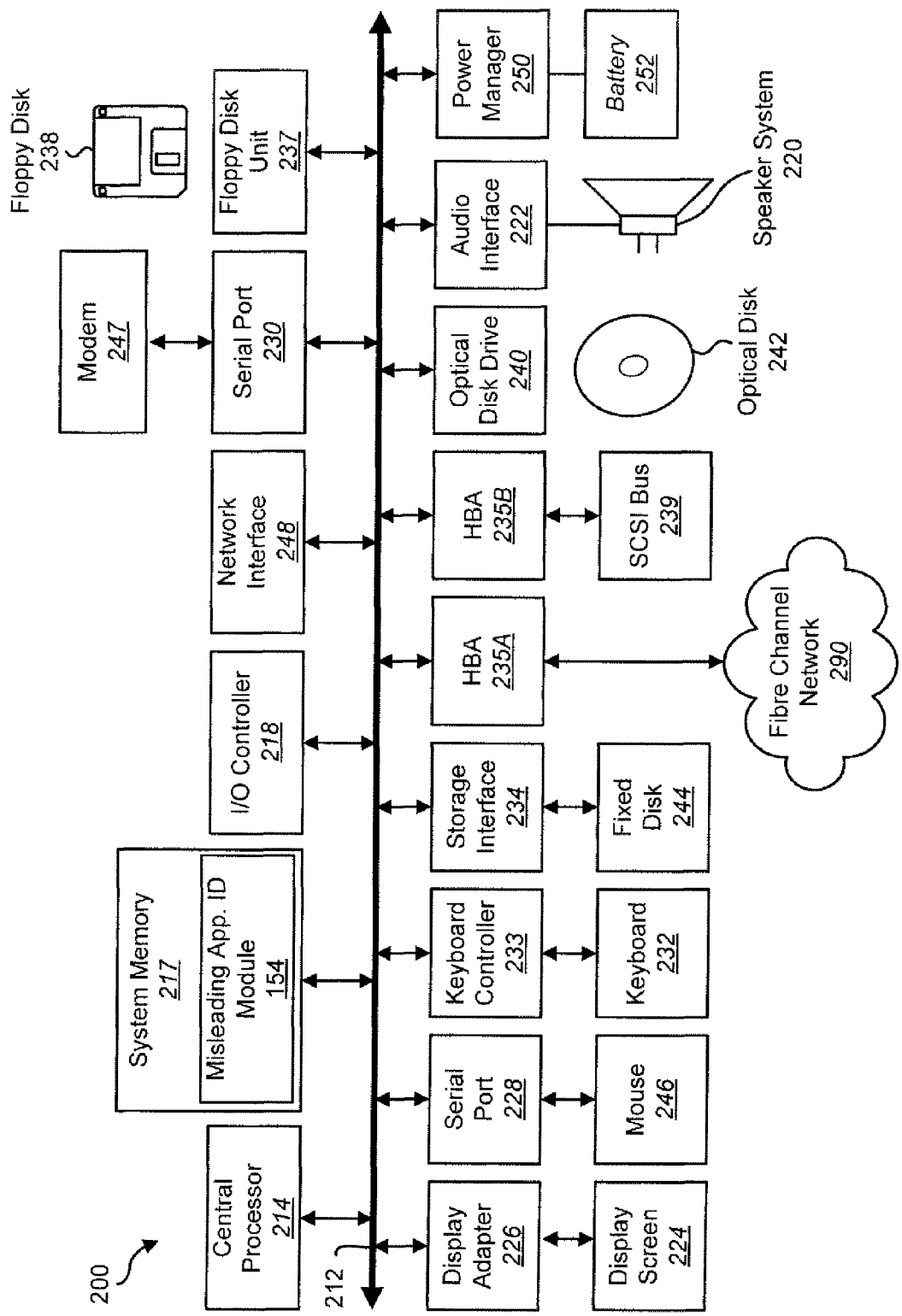
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, gateways, firewalls, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage.

According to some embodiments, clients 110, 120, and/or 130 may contain one or more portions of software for identification of misleading applications such as, for example, misleading application identification module 154. As illustrated, one or more portions of misleading application identification module may reside at a network centric location. For example, server 140A may be a server, a firewall, a gateway, or other network element that may perform one or more actions to identify a misleading application. According to some embodiments, network 190 may be an external network (e.g., the Internet) and server 140A may be a gateway or firewall between one or more internal network elements and clients and the external network.

Misleading application identification module 154 may identify misleading applications such as, for example, a fake anti-virus software product, a fake network security software product, a fake anti-spyware software product, a fake computer disk optimization software product, a fake operating system update software product, a fake operating system registry tool software product, and a fake computer optimization software product. Misleading application identification module 154 may analyze a request for network data to determine if one or more portions of the request match a suspicious indicator. For example, a request for network data may contain a requested Uniform Resource Locator (URL) or other network address. The URL may contain a string associated with a keyword that is suspicious. Misleading application identification module 154 may contain or access a list or other data structure containing suspicious keywords. For example, a suspicious keyword may be "anti-spyware", "anti-virus", "registry cleaner", or another indicator of frequently faked software which is often malware. Misleading application identification module 154 may consider one or more additional factors. For example, misleading application identification module 154 may determine that a domain is not a recognized and/or approved software vendor associated with a product keyword identified in the request (e.g., not Symantec, MacAfee, or another recognized vendor). According to some embodiments, in the event that a domain is associated with a recognized vendor, a suspicious keyword may be ignored. According to some embodiments, a suspicious keyword may be a domain that is close is spelling to a known domain but is not a recognized variant of that domain (e.g., an intentional misspelling of a vendor website to trap the unwary user; "Symantic", "Mackaffee", etc.) A suspicious keyword may also be a variation of a recognized product name (e.g., "Nortin Anti-Virus") at a unrecognized domain or network address. Other suspicious keywords may include recognized product names at unrecognized domains or network addresses (e.g., the detection of a legitimate product name at an unrecognized domain or network address).

According to some embodiments, if a suspicious indicator such as a keyword is detected, misleading application identification module 154 may perform one or more other actions. For example, misleading application identification module 154 may retrieve additional data associated with a network address in the request for network data. For example, misleading application identification module 154 may retrieve a web page or other data associated with a network address in a request for network data. Misleading application identification module 154 may then parse the web page or other network data to identify one or more suspicious indicators. For example, suspicious indicators may include keywords associated with malware, metadata associated with malware, and downloadable malware.

According to some embodiments, misleading application identification module 154 may check other attributes associated with a request for network data. Misleading application identification module 154 may receive or identify an indicator that the request for network data matches a known malware domain, an indicator that requested network data contains a malware signature, an indicator that requested network data is associated with software having suspicious behavior, an indicator that the request for network data matches a software product with a suspicious reputation, and/or an indicator that requested network data is associated with software containing suspicious strings. These other types of suspicious indicators (e.g., signature based indicators, behavioral based indicators, reputation based indicators, and indicators associated with downloaded software) may be evaluated together with indicators associated with a request for network data (e.g., a portion of a URL or network address) and indicators present at a network address (e.g., parsed webpage material from a network address of a request for network data).

According to some embodiments, misleading application identification module 154 may evaluate one or more suspicious indicators against a specified threshold to determine whether the suspicious indicators meet or exceed the threshold. Different types of indicators may be given greater or lesser weighting in the evaluation. For example, a misspelling of a known security product domain name (e.g., Symantic) may be considered more suspicious than the word anti-virus in a URL. Combinations of indicators may raise a level of suspicion for a network request causing it to meet or exceed a threshold that may not be met by any one individual indicator. For example, a first indicator may be the presence of the word "anti-spyware" in a portion of a network data request such as a URL. A second indicator may be that the domain associated with the URL of the network data request is not associated with a known security product vendor (misleading application identification module 154 may contain or have access to a list of approved software vendors which may be classified by product type or otherwise indexed or sorted). A third indicator may be that the network data request is directed to a network address containing suspicious indicators (e.g., indicators of malware contained in a parsed webpage specified by a network data request). These three indicators may be combined to exceed a specified threshold in this example. The threshold may be specified by a security product supplier, an administrator, a user, or another person.

If a threshold is met or exceeded, a specified action may be performed. The specified action may include one or more of logging the request for network data, denying the request for network data, prompting a user, alerting an administrator, generating a report, deleting downloaded software, quarantining downloaded software, adding a network address to a list of known and/or suspected malware sites, adding a network address to a list of blocked sites, and/or allowing the request for network data. According to some embodiments, misleading application identification module 154 may allow the setting of multiple thresholds or the specification of multiple actions. Misleading application identification module 154 may trigger or perform one or more specified actions. Actions may include prompting an administrator. According to some embodiments, an administrator may receive a prompt associated with a request for network data and may determine whether the request is associated with malware. The administrator may provide feedback (e.g., allow or deny request) which may be used to determine whether suspicious indicators should be maintained on a list of suspicious indicators or removed from a list of suspicious indicators (e.g., the vendor may be confirmed as a malware author or as a legitimate software vendor).

Misleading application identification module 154 may use, receive, access, distribute, and/or maintain a list or other data structure of suspicious indicators. For example, if a network data request is determined to be associated with malware, misleading application identification module 154 may store one or more suspicious indicators. As a specific example, a network request may be received with a URL containing a fake software product name, and the fake software product name may be stored as a suspicious indicator. This suspicious indicator may be used to identify malware if a different URL containing a different domain references the same fake software product. According to some embodiments, suspicious indicators (e.g., keywords associated with malware and/or strings associated with malware) may be accumulated by a security software vendor, a network administrator, a user, or a security software process. Accumulated suspicious indicators may be distributed to one or more clients (e.g., clients 110, 120, 130) and/or to a gateway, server, or firewall (e.g., server 140A). Suspicious indicators may be received as an update by misleading application identification module 154 and may be used to identify misleading applications. Different classes, rankings, or ratings of suspicious indicators may be provided based upon a threat level or a level of correlation between a keyword or indicator and malware or other threats.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, misleading application identification module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known or to be developed operating system. Power manager 250 may monitor a power level of battery 252.

Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptible Power Supply (UPS) located either local to or remote from computer system 200. In such embodiments, power manager 250 may provide information about a power level of an UPS.

Figure 3:
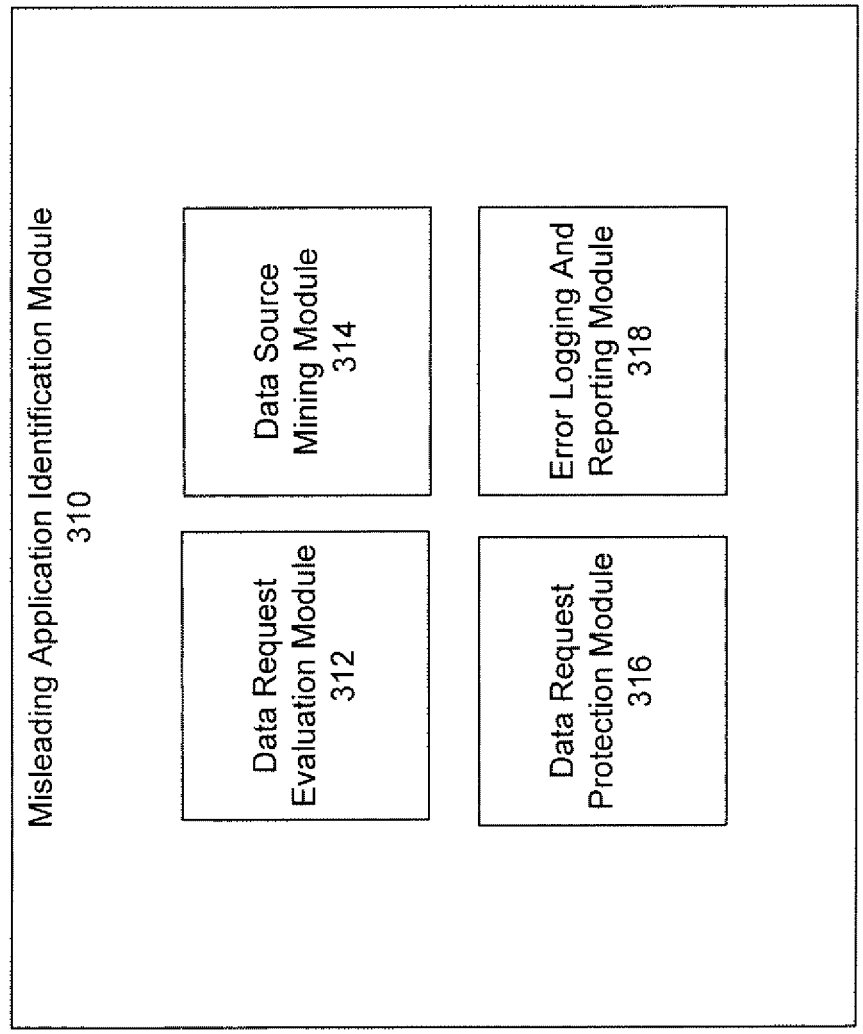
FIG. 3 shows a module for identifying misleading applications in accordance with an embodiment of the present disclosure.

Referring to FIG. 3, there is shown a misleading application identification module 310 in accordance with an embodiment of the present disclosure. As illustrated, the misleading application identification module 310 may contain one or more components including a data request evaluation module 312, a data source mining module 314, a data request protection module 316, and an error logging and reporting module 318.

The description below describes network elements, computers, and/or components of a system and method for identifying misleading applications that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The data request evaluation module 312 may parse a network data request to identify one or more suspicious indicators in the request. The data request evaluation module 312 may provide suspicious indicators to data request protection module 316 to identify misleading applications such as, for example, a fake anti-virus software product, a fake network security software product, a fake anti-spyware software product, a fake computer disk optimization software product, a fake operating system update software product, a fake operating system registry tool software product, and a fake computer optimization software product. The data request evaluation module 312 may analyze a request for network data to determine if one or more portions of the request match a suspicious indicator. For example, a request for network data may contain a requested Uniform Resource Locator (URL) or other network address. The URL may contain a string associated with a keyword that is suspicious. The data request evaluation module 312 may contain or access a list or other data structure containing suspicious keywords. For example, a suspicious keyword may be "anti-spyware", "anti-virus", "registry cleaner", or another indicator of frequently faked software which is often malware.

The data source mining module 314 may retrieve additional data associated with a network address in the request for network data. For example, the data source mining module 314 may retrieve a web page or other data associated with a network address in a request for network data. The data source mining module 314 may parse the web page or other network data to identify one or more suspicious indicators. For example, suspicious indicators may include keywords associated with malware, metadata associated with malware, and downloadable malware.

The data request protection module 316 may consider one or more additional factors. For example, the data request protection module 316 may determine that a domain is not a recognized and/or approved software vendor associated with a product keyword identified in the request (e.g., not Symantec, MacAfee, or another recognized vendor). According to some embodiments, in the event that a domain is associated with a recognized vendor, a suspicious keyword may be ignored. According to some embodiments, a suspicious keyword may be a domain that is close is spelling to a known domain but is not a recognized variant of that domain (e.g., an intentional misspelling of a vendor website to trap the unwary user; "Symantic", "Mackaffee", etc.) A suspicious keyword may also be a variation of a recognized product name (e.g., "Nortin Anti-Virus") at a unrecognized domain or network address. Other suspicious keywords may include recognized product names at unrecognized domains or network addresses (e.g., the detection of a legitimate product name at a unrecognized domain or network address).

The data request protection module 316 may perform one or more actions if a suspicious indicator is identified. A specified action may include one or more of logging the request for network data, denying the request for network data, prompting a user, alerting an administrator, generating a report, deleting downloaded software, quarantining downloaded software, adding a network address to a list of known and/or suspected malware sites, adding a network address to a list of blocked sites, and/or allowing the request for network data.

The error logging and reporting module 318 may produce logs, reports, or other information associated with identifying misleading applications.

Figure 4:
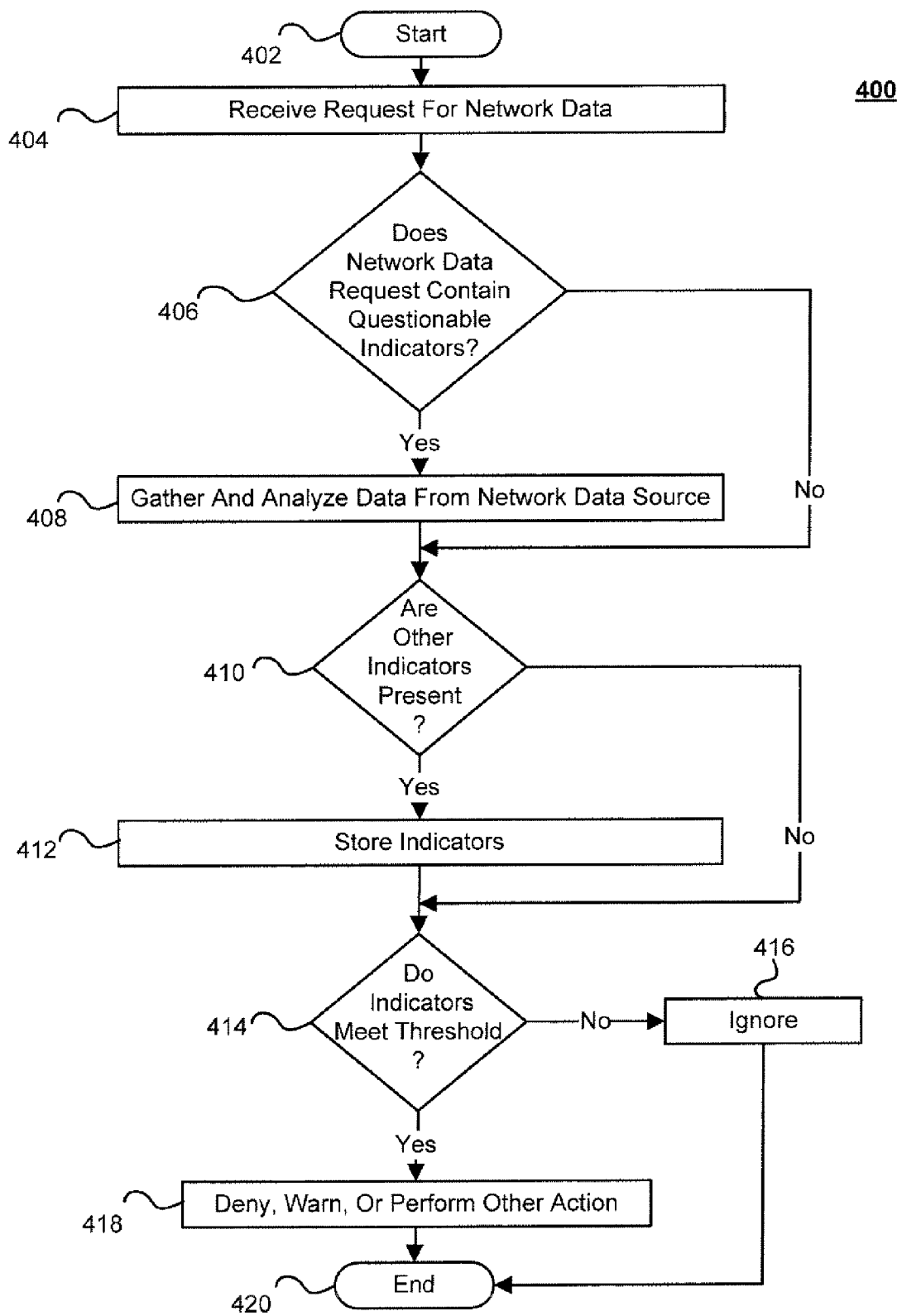
FIG. 4 depicts a method for identifying misleading applications in accordance with an embodiment of the present disclosure.

Referring to FIG. 4, there is depicted a method 400 for identifying misleading applications in accordance with an embodiment of the present disclosure. At block 402, the method 400 may begin.

At block 404, a network data request may be received. A network data request may be analyzed at a gateway, at a client, at a server, and/or at another network element. A network data request may be an HTTP based request, an FTP request, an SMS (Short Message Service) based message, or another network protocol. The network data request may be analyzed to determine whether the requested data is safe prior to download of the data.

At block 406, the network data request may be analyzed to determine if the request contains questionable or suspicious indicators. Suspicious indicators may include keywords or strings frequently associated with malware. For example, a suspicious keyword may be "anti-spyware", "anti-virus", "registry cleaner", or another indicator of frequently faked software which is often malware. Other indicators may be present in a request for network data that are also suspicious indicators. For example, a domain that is not a recognized and/or approved software vendor may be associated with a product keyword identified in the request (e.g., not Symantec, MacAfee, or another recognized vendor). According to some embodiments, a suspicious keyword may be a domain that is close is spelling to a known domain but is not a recognized variant of that domain (e.g., an intentional misspelling of a vendor website to trap the unwary user; "Symantic", "Mackaffee", etc.) A suspicious keyword may also be a variation of a recognized product name (e.g., "Nortin Anti-Virus") at a unrecognized domain or network address. Other suspicious keywords may include recognized product names at unrecognized domains or network addresses (e.g., the detection of a legitimate product name at a unrecognized domain or network address). If one or more suspicious indicators are present, the method 400 may continue at block 408. If no suspicious indicators are present in a request for network data, the method 400 may continue at block 410.

At block 408, the method 400 may comprise retrieving a web page or other data associated with a network address in a request for network data. The web page or other network data may be parsed to identify one or more suspicious indicators. For example, suspicious indicators may include keywords associated with malware, metadata associated with malware, and downloadable malware. Identified suspicious indicators from a network data request and/or a network data address may be stored.

At block 410, the method 400 may comprise determining whether other indicators are present. Other indicators may include an indicator that the request for network data matches a known malware domain, an indicator that requested network data contains a malware signature, an indicator that requested network data is associated with software having suspicious behavior, an indicator that the request for network data matches a software product with a suspicious reputation, and/or an indicator that requested network data is associated with software containing suspicious strings. These other types of suspicious indicators (e.g., signature based indicators, behavioral based indicators, reputation based indicators, and indicators associated with downloaded software) may be evaluated together with indicators associated with a request for network data (e.g., a portion of a URL or network address) and indicators present at a network address (e.g., parsed webpage material from a network address of a request for network data). If other indicators are present, the method 400 may continue at block 412. If no other indicators are present, the method may continue at block 414.

At block 412, indicators may be stored. Indicators may be stored in a database, a list, or another data structure or repository. Indicators may be distributed to one or more clients. Indicators identified at a client level may also be forwarded to a central repository for further distribution and/or analysis (e.g., a client may identify a malware keyword that may be forwarded to a central repository for further analysis or distribution to other clients).

At block 414, the method 400 may comprise determining whether one or more identified suspicious indicators meet or exceed a specified threshold. Different types of indicators may be given greater or lesser weighting in the evaluation. Combinations of indicators may raise a level of suspicion for a network request causing it to meet or exceed a threshold that may not be met by any one individual indicator. A threshold may be specified by a security product supplier, an administrator, a user, or another person. According to some embodiments, one or more thresholds may be set as a default with a security product and may be adjustable by an administrator or an end-user. If identified suspicious indicators meet a threshold, the method 400 may continue at block 418. If identified suspicious indicators do not meet a threshold, the method 400 may continue at block 416.

At block 416, the suspicious indicators may be ignored. According to some embodiments, a log may be generated allowing further review of suspicious indicators and adjustment of one or more thresholds and/or addition of or removal of keywords for a suspicious indicator list.

At block 418, one or more actions may be performed. The action may include one or more of logging the request for network data, denying the request for network data, prompting a user, alerting an administrator, generating a report, deleting downloaded software, quarantining downloaded software, adding a network address to a list of known and/or suspected malware sites, adding a network address to a list of blocked sites, and/or allowing the request for network data. According to some embodiments, actions may include prompting an administrator. An administrator may receive a prompt associated with a request for network data and may determine whether the request is associated with malware. The administrator may provide feedback (e.g., allow or deny request) which may be used to determine whether suspicious indicators should be maintained on a list of suspicious indicators or removed from a list of suspicious indicators (e.g., the vendor may be confirmed as a malware author or as a legitimate software vendor).

At block 420, the method 400 may end.

At this point it should be noted that identifying misleading applications in accordance with the present disclosure as described above typically involves the processing of input data and the generation of output data to some extent. This input data processing and output data generation may be implemented in hardware or software. For example, specific electronic components may be employed in an misleading applications identification module or similar or related circuitry for implementing the functions associated with identifying misleading applications in accordance with the present disclosure as described above. Alternatively, one or more processors operating in accordance with instructions may implement the functions associated with identifying misleading applications in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for identifying misleading applications comprising:

receiving a request for network data;

parsing the request for network data, using a misleading application identification device, to determine if one or more portions of the request match a suspicious indicator, wherein parsing the request for network data comprises matching a portion of the request for network data against one or more keywords, and wherein the suspicious indicator is a portion of the request other than a source address and a connection port;

identifying, using the misleading application identification device, the suspicious indicator without using a known malware domain, a known malware signature, or a known malware network indicia, wherein identification is performed prior to receiving any network data from a target of the request; and performing a specified action in the event one or more portions of the request match the suspicious indicator.

2. The method of claim 1, wherein the request for network data contains a Uniform Resource Locator (URL).

3. The method of claim 1, wherein the keywords comprise one or more of: frequently faked software packages, frequently faked software services, and unknown variants of an approved software package.

4. The method of claim 1, wherein parsing the request for network data to determine if one or more portions of the request match a suspicious indicator further comprises matching a portion of the request for network data against known software vendor domains to determine if the request is an unknown variation of a known software vendor domain.

5. The method of claim 1, further comprising using a list of approved vendors for a software product type and marking the request for network data as suspicious in the event the request for network data is associated with the software product type and the request for network data is not associated with a vendor on the list of approved vendors.

6. The method of claim 5, wherein the software product type comprises at least one of: an anti-virus software product; a network security software product; an anti-spyware software product; a computer disk optimization software product; an operating system update software product; an operating system registry tool software product; and a computer optimization software product.

7. The method of claim 1, further comprising:

determining if the one or more portions of the request matching the suspicious indicator meets a specified threshold; and performing the specified action in the event that the specified threshold is met.

8. The method of claim 7, further comprising:

evaluating one or more other types of indicators; and determining if a combination of the one or more portions of the request matching the suspicious indicator and the one or more other types of indicators meet the specified threshold.

9. The method of claim 8, wherein the one or more other types of indicators comprise at least one of: an indicator that the request for network data matches a known malware domain; an indicator that requested network data contains a malware signature; an indicator that requested network data is associated with software having suspicious behavior; an indicator that the request for network data matches a software product with a suspicious reputation; and an indicator that requested network data is associated with software containing suspicious strings.

10. The method of claim 1, wherein the specified action comprises at least one of:

logging the request for network data;

denying the request for network data;

prompting a user;

alerting an administrator; and allowing the request for network data.

11. The method of claim 1, further comprising:

accessing a network site associated with the request for network data;

evaluating a portion of data at the network site to determine if the portion of data at the network site matches the suspicious indicator; and performing the specified action in the event the portion of data at the network site matches the suspicious indicator.

12. The method of claim 11, wherein evaluating a portion of data at the network site to determine if the portion of data at the network site matches the suspicious indicator comprises parsing a web page to identify at least one of: keywords associated with malware; metadata associated with malware; and downloadable malware.

13. The method of claim 1, further comprising maintaining a list of keywords to be used as suspicious indicators and providing the list of keywords to at least one of: a client based security application; a firewall; a gateway; and a network based security application.

14. At least one processor readable non-transitory storage medium for storing a computer program of instructions configured to be readable by at least one processor for instructing the at least one processor to execute a computer process for performing the method as recited in claim 1.

15. An article of manufacture for identifying misleading applications, the article of manufacture comprising:

at least one non-transitory processor readable storage medium; and instructions stored on the at least one medium;

wherein the instructions are configured to be readable from the at least one medium by at least one processor and thereby cause the at least one processor to operate so as to:

receive a request for network data;

parse the request for network data to determine if one or more portions of the request match a suspicious indicator, wherein parsing the request for network data comprises matching a portion of the request for network data against one or more keywords, and wherein the suspicious indicator is a portion of the request other than a source address and a connection port;

identify the suspicious indicator without using a known malware domain, a known malware signature, or a known malware network indicia, wherein identification is performed prior to receiving any network data from a target of the request; and perform a specified action in the event one or more portions of the request match the suspicious indicator.

16. A system for identifying misleading applications comprising:

electronic memory configured to store one or more instructions;

one or more processors communicatively coupled to a network, wherein the one or more processors are configured to:

receive a request for network data;

parse the request for network data to determine if one or more portions of the request match a suspicious indicator, wherein parsing the request for network data comprises matching a portion of the request for network data against one or more keywords, and wherein the suspicious indicator is a portion of the request other than a source address and a connection port;

identify the suspicious indicator without using a known malware domain, a known malware signature, or a known malware network indicia, wherein identification is performed prior to receiving any network data from a target of the request; and perform a specified action in the event one or more portions of the request match the suspicious indicator.

17. The system of claim 16, wherein parsing the request for network data to determine if one or more portions of the request match a suspicious indicator further comprises:

matching a portion of the request for network data against known software vendor domains to determine if the request is an unknown variation of a known software vendor domain.

18. The system of claim 16, wherein the one or more processors are further configured to:

evaluate one or more other types of indicators;

determine if a combination of the one or more portions of the request matching the suspicious indicator and the one or more other types of indicators meet a specified threshold; and perform the specified action in the event that the specified threshold is met;

wherein the one or more other types of indicators comprise at least one of: an indicator that the request for network data matches a known malware domain; an indicator that requested network data contains a malware signature; an indicator that requested network data is associated with software having suspicious behavior; and an indicator that requested network data is associated with software containing suspicious strings.

19. The system of claim 16, wherein the one or more processors are further configured to:

access a network site associated with the request for network data;

evaluate a portion of data at the network site to determine if the portion of data at the network site matches the suspicious indicator; and perform a specified action in the event the portion of data at the network site matches the suspicious indicator.

* * * * *